C. L. STOELTZLEN

CONNECTER

Nov. 25, 1930. Re. 17,880

Original Filed Jan. 16, 1929

INVENTOR
Charles L. Stoeltzlen
BY
Edwards, Sager & Bowen
ATTORNEY

Reissued Nov. 25, 1930 Re. 17,880

UNITED STATES PATENT OFFICE

CHARLES L. STOELTZLEN, OF ERIE, PENNSYLVANIA, ASSIGNOR TO PENN-UNION ELECTRIC CORPORATION, A CORPORATION OF PENNSYLVANIA

CONNECTER

Original No. 1,739,740, dated December 17, 1929, Serial No. 332,810, filed January 16, 1929. Application for reissue filed July 29, 1930. Serial No. 471,516.

My invention relates to connecters for making joints between electrical conductors or cables and more particularly to connecters for use where a branch circuit is to be taken from a main circuit, the main circuit not being cut or disconnected but merely connected to the branch circuit. Connecters of this general type have been used before, Patent No. 1,012,102 issued to Joseph Sachs on December 19, 1911, being illustrative of this type of connecter.

One of the objects of the invention is to provide clamping means for tightening the connecter to the main cable and a branch cable simultaneously by one operation and to furthermore equalize the clamping pressures as perfectly as possible between the two cables so that the tendency will be to tighten the connecter to that cable which is resisting tightening the least and therefore is most in need of being tightened.

It is also an object of the invention to reduce to a minimum all incidental friction not needed for the proper operation of the device and more particularly the torque exerted on the nuts in tightening is made as nearly as possible equivalent to the clamping forces on the cables so that the torque thus exerted may be a measure of such tightening and not of friction losses and the workman may know accurately the exact amount of tightening that has been exerted on the cables.

It is a further object of the invention to have each part carefully selected and adapted to the function that it is to perform. For example, a part that should be rugged to withstand longitudinal stresses will not be constructed to perform the function of a spring, and conversely a part that is to perform the function of a spring will not be required to sustain stresses that call for ruggedness of construction.

A still further object of the invention is to provide simplicity in construction and also a maximum amount of interchangeability between the parts for different sizes so that a minimum number of different parts will be required to provide for the different sizes and combinations of cables. This tends to reduce the cost of manufacturing and is also desirable for the user who does not need to carry as large a stock.

Figure 1:
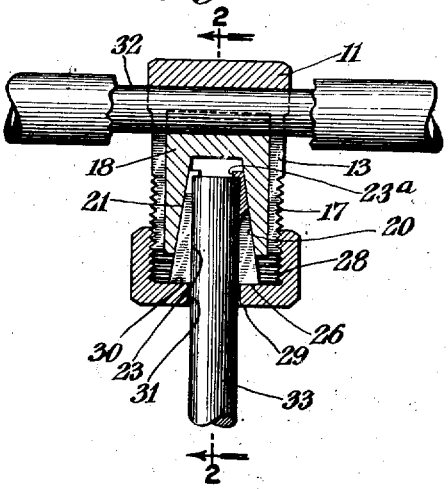
Figure 2:
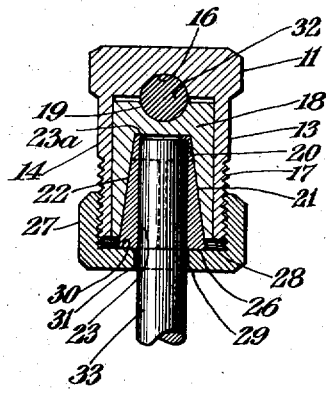
Figure 3:
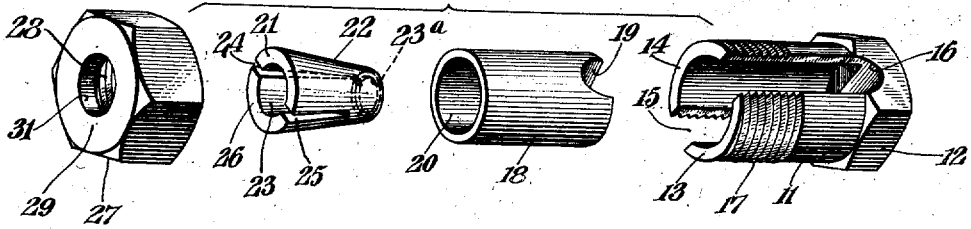

In order to more clearly explain the invention reference is made to the accompanying drawings showing one embodiment of the invention in which, Fig. 1 is a sectional view of a connecter in position on a main cable and a branch cable before being tightened or clamped thereto;

Fig. 2 is a transverse sectional view taken on the line 2—2 of Fig. 1 but with the connecter shown clamped tightly to the cables; and Fig. 3 is an exploded view of the connecter showing the different parts thereof more in detail.

The reference character 11 indicates generally a yoke member which may be provided with a hexagonal head 12 to which a wrench may be applied for holding it more firmly in position during the tightening operation. Two legs 13 and 14 extend from the head 12 to provide therebetween an opening 15 which is preferably cylindrical in form. The opening 15 at the end nearest to the nut is arcuate in form to conform to the shape of the conductor or cable against which it is to be clamped. This arcuate portion or groove 16 is shown smooth but it may be provided, if desired, with serrations or teeth to assist in gripping the cable. The lower outer portion of the legs 13 and 14 is threaded as indicated at 17.

A body member is shown at 18 and is cylindrical in form and of the proper diameter to readily slide into the cylindrical opening 15 of the yoke member 11. One end of the member 18 is provided with a transverse arcuate groove 19 which is complementary to the groove 16 and cooperates therewith in clamping the main cable. The other end of the body member 18 may be provided with a tapered recess 20.

There may also be provided a sleeve 21 having its external surface tapered as at 22 to fit into the tapered recess 20 of the body member 18. The interior 23 of the sleeve 21 is cylindrical and its diameter is such that it will readily slip over the branch cable to which it is to be clamped. The sleeve 21 is slit as indicated at 24 throughout its entire length and is also slit as indicated at 25 throughout the greater part of its length. This slitting gives to the sleeve considerable resiliency so that as it is forced into the recess 20 it will contract and grip the cable to hold it fast. The inner cylindrical portion 23 is shown smooth but it may be provided, if desired, with teeth or serrations to assist in gripping the cable. A surface 26 is provided at the larger end of the sleeve and is preferably substantially perpendicular to the axis of the sleeve so that any force against the surface parallel to the axis of the sleeve will be substantially normal to the surface. The inner cylindrical portion 23 is preferably provided with a shoulder 23ª at the smaller end of the sleeve.

A suitable member for drawing the parts together may be provided in a nut 27 having threads 28 on the interior thereof for engagement with the threads 17 on the yoke member 11. The nut 27 is provided with a flange 29 which has a surface 30 substantially perpendicular to the axis of the nut, this surface being adapted to engage the surface 26 of the sleeve 21. The flange 29 is also provided with an aperture 31 through which a branch cable may pass.

In applying the above described connecter to a main cable 32 and a branch cable 33 the operation is as follows: The two legs 13 and 14 of the yoke member 11 are slipped over the main cable 32 so that the groove 16 fits around the cable. The body member 18 is then slipped into the opening 15 and the groove 19 brought against the opposite side of the main cable 32 from that against which the yoke rests. The branch cable 33 is then slipped through the aperture 31 of the nut 27 and into the interior 23 of the sleeve 21 which is then inserted into the recess 20 of the body member 18. The nut 27 is next screwed up on the threads 17 of the yoke member 11. This draws the yoke member against the main cable with a uniform or equalized pressure as the forces acting on the two legs 13 and 14 are equal and at the same time the nut presses against the sleeve 21 and forces it into the body member 18. The axial force against the body member 18 presses the groove 19 against the main cable 32 and clamps the cable tightly against the yoke. Because of the tapered form of the sleeve and of the recess there are also radial forces brought into play between these parts and the sleeve is squeezed and tightened on the branch cable.

It will be noted that the shoulder 23ª prevents the branch cable 33 from protruding beyond the smaller end of the sleeve 21. If the branch cable 33 were permitted to rest against the bottom of the recess 20 in the body member 18 in the preliminary position shown in Fig. 1, then the longitudinal movement of the sleeve 21 into the position of Fig. 2 would result in a sliding movement of the sleeve on the cable 33 with a tendency to loosen the grip between the sleeve and cable during the very operation of tightening.

It should be noted that the sleeve 21, at least after it has begun to tighten on the branch cable 33, does not rotate and any tendency to rotate it is undesirable. The nut 27 does rotate and the friction between the nut and the sleeve produces an undesirable twisting or rotating force on the sleeve. But by having the surfaces 26 and 30 between which such friction occurs positioned normally to the axial forces therebetween, such friction is a minimum. By thus making such friction a minimum the force exerted by the workman on the nut becomes an accurate measure of the actual tightening which has taken place on the two cables. Many devices of the prior art were so arranged that the friction between the revolving nut or its equivalent and the stationary part corresponding to the sleeve took place between wedged surfaces and to overcome the resultant excessive friction greater force was often required than was transmitted to the clamped cables. Under such conditions it is not possible to know whether the cables have been properly clamped or not.

It should also be noted that the body member 18 which clamps the cable 32 is strong and rugged. The sleeve 21 on the contrary is designed primarily for resiliency. Furthermore different sizes of body members may be designed for different sizes of main cables without altering the sleeve 21. Each of these parts may be designed for its own function and such design is not limited or restricted by the function required on the other part. The design of the sleeve may also be altered for different sizes of branch cable with little or no change in the design of the body member 18. By designing each of these parts for the particular function it is to perform a more efficient and satisfactory structure is obtained and also the different combinations between different sizes of main cables and branch cables may be obtained with a minimum number of parts or a minimum number of changes in the parts.

I claim:

1. In a cable connector, a yoke member having a pair of legs for straddling a main cable and provided with threads on the external portion of the legs whereby the yoke member may be drawn against the cable with the same force on each leg, a body member positioned between said legs and having one end adapted to engage the main cable and the other end thereof provided with a tapered recess, a separate clamping sleeve for a branch cable positioned in said recess, and adapted to tighten on the branch cable by being forced into the recess and a nut engaging said threads for drawing the yoke member against one side of the main cable and having a surface for pressing the sleeve into the recess whereby the sleeve is clamped on the branch cable and the body member is simultaneously pressed against the main cable on the opposite side from the yoke, the surfaces of the sleeve and nut which transmit pressures therebetween lying substantially normal to the forces being transmitted between the nut and the main cable so that the friction between said surfaces is a minimum.

2. In a cable connecter, a yoke member having a pair of legs for straddling a main cable the upper portion between the legs being arcuate in form to provide a gripping surface for the cable and the lower portion between the legs formed to provide a cylindrical opening and the outside of the lower portion of the legs being threaded whereby the yoke may be drawn against the cable with the same force on each leg, a cylindrical body member positioned in said opening and having at one end a transverse arcuate groove to provide a complementary gripping surface for the previously named gripping surface and having a tapered recess at the other end thereof, a tapered clamping sleeve for a branch cable positioned in said recess and adapted to tighten on the branch cable by being forced into the recess, and a nut engaging said threads for drawing the yoke member against one side of the main cable and having a surface for pressing the sleeve into the recess whereby the sleeve is clamped on the branch cable and the body member is simultaneously pressed against the main cable on the opposite side from the yoke, the surfaces of the sleeve and nut which transmit pressures therebetween lying substantially normal to the forces being transmitted between the nut and the main cable so that the friction between said surfaces is a minimum.

3. In a cable connecter, a yoke member having a pair of legs for straddling a main cable, the upper portion between the legs being arcuate in form to provide a gripping surface for the cable and the lower portion between the legs formed to provide a cylindrical opening and the outside of the lower portion of the legs being threaded whereby the yoke may be drawn against the cable with the same force on each leg, a cylindrical body member positioned in said opening and having at one end a transverse arcuate groove to provide a complementary gripping surface for the previously named gripping surface and having a recess at the other end thereof, means positioned in said recess for clamping a branch cable when said means is pressed toward the bottom of the recess, and a nut engaging said threads for drawing the yoke member against one side of the main cable and having a surface for pressing said means toward the bottom of said recess whereby said means is clamped on the branch cable and the body member is simultaneously pressed against the main cable on the opposite side from the yoke, the surfaces of said means and nut which transmit pressures therebetween lying substantially normal to the forces being transmitted between the nut and the main cable so that the friction between said surfaces is a minimum.

4. In a cable connecter a yoke member having a pair of legs spaced apart sufficiently to receive between them the main cable and of generally arcuate form in section with threads on the external portions of the legs whereby the yoke member may be drawn against the cable with the same force on each leg, and cylindrically surfaced on the interior to receive a cylindrical body member, a cylindrical body member positioned between said legs and having one end adapted to bring pressure against said main cable to force it against said voke member, and the other end thereof provided with a tapered recess, a separate tapered clamping sleeve for the end of a branch cable positioned in said recess and adapted to tighten on the branch cable by being forced into the recess, and means for forcing said sleeve member into said recess and pressing said body member against said main cable comprising a nut having threads engaging the threads of the yoke member so as to be longitudinally forced with respect to said yoke member by relative rotary movement between the nut and yoke.

5. In a cable connecter a yoke member having a head portion adapted to engage one side of a main cable and legs spaced apart to fit over said cable, a body member adapted to engage the other side of said main cable and formed to fit within said yoke member and having a tapered recess at its end, a nut member threaded on the outside of each of said legs and having an inwardly extending portion forming a bearing surface, and separate means for gripping the end of a branch cable comprising a split sleeve having a central opening and a tapered periphery fitting in the tapered recess in said body member and adapted to be forced longitudinally into said body recess to contract on said branch cable and to simultaneously force said body member against said main cable as said nut member is rotated to cause pressure in one direction on said yoke member and in an opposite direction on said body member.

Signed at Erie, in the county of Erie, State of Pennsylvania, this 24th day of July, 1930.

CHARLES L. STOELTZLEN.